United States Patent
Early

[11] Patent Number: 5,921,531
[45] Date of Patent: Jul. 13, 1999

[54] RETRACTABLE HANDRAIL FOR RAILROAD CARS

[76] Inventor: Stephen R. Early, 15602 W. 145th Terrace, Olathe, Kans. 66052

[21] Appl. No.: 08/820,558

[22] Filed: Mar. 19, 1997

[51] Int. Cl.[6] ............................................. E04H 17/14
[52] U.S. Cl. .............................. 256/65; 256/59; 105/437; 105/457; 182/113
[58] Field of Search ................................ 256/59, 65, 67; 182/113; 105/437, 457, 439

[56] References Cited

U.S. PATENT DOCUMENTS

| | | |
|---|---|---|
| 312,787 | 2/1885 | Wyman . |
| 538,161 | 4/1895 | Francis et al. . |
| 560,238 | 5/1896 | Smith, Jr. . |
| 2,090,494 | 8/1937 | Willoughby . |
| 2,738,913 | 3/1956 | Taylor ................................. 182/113 X |
| 4,371,056 | 2/1983 | Anglade . |
| 4,391,347 | 7/1983 | Cronan et al. . |
| 4,613,155 | 9/1986 | Greenwood . |
| 4,669,683 | 6/1987 | Guillory . |
| 4,757,768 | 7/1988 | Agelakopoulos . |
| 4,909,483 | 3/1990 | Van Herpen ............................. 256/59 |
| 4,936,407 | 6/1990 | Brock et al. . |
| 5,237,932 | 8/1993 | Edwards . |

*Primary Examiner*—Brian K. Green
*Assistant Examiner*—William L. Miller
*Attorney, Agent, or Firm*—Chase & Yakimo, L.C.

[57] ABSTRACT

A handrail assembly for access walkways on railway hopper cars is movable between a retracted position, where the assembly is stored for transit, and an extended position where the posts and rails of the assembly are raised to provide a protective barrier. The posts and rails are pivotally interconnected to provide a parallel linkage, each of the posts swinging about an axis that is displaced from a right angle to the longitudinal axis of the walkway. Also, the posts are inclined from the vertical when the assembly is in its extended position. The combined effect of the displacement and the inclination maintains the components of the assembly within allowable clearances and precludes interference with the top surface of the car body. A counterweight arrangement allows the posts and rails to be easily raised manually from one end of the car, and a mechanical lock is provided to positively retain the assembly in either its extended or retracted position.

16 Claims, 6 Drawing Sheets

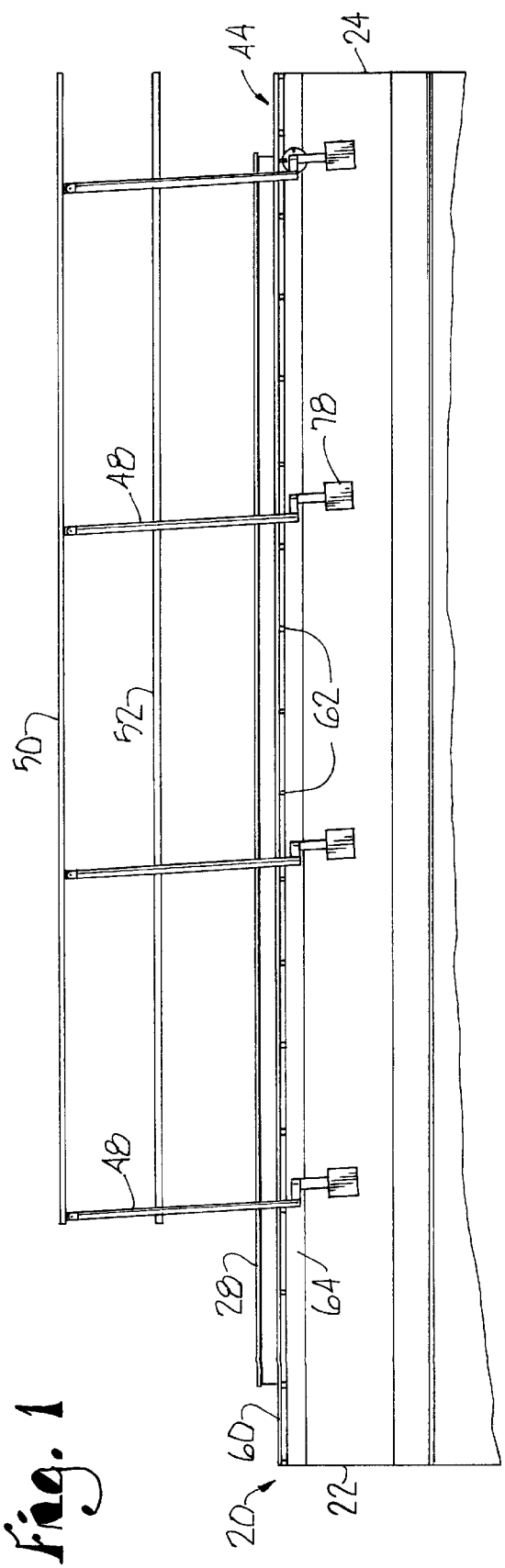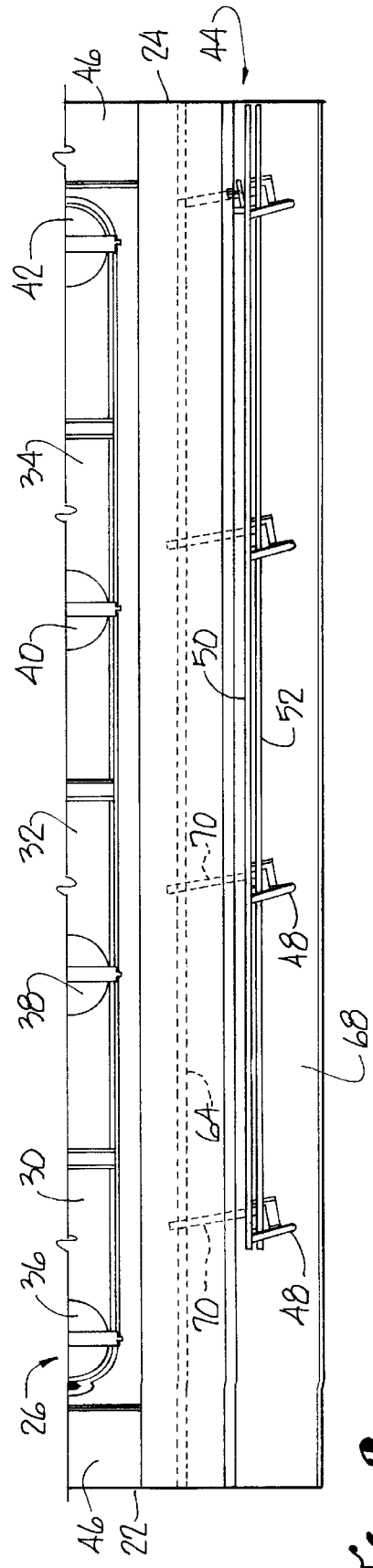

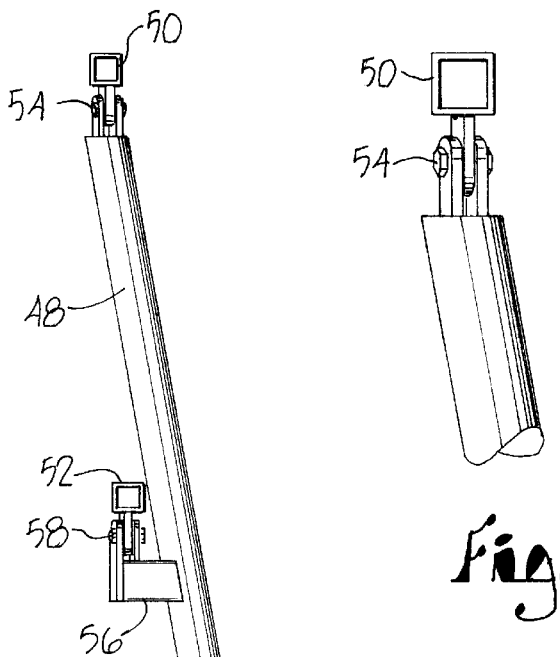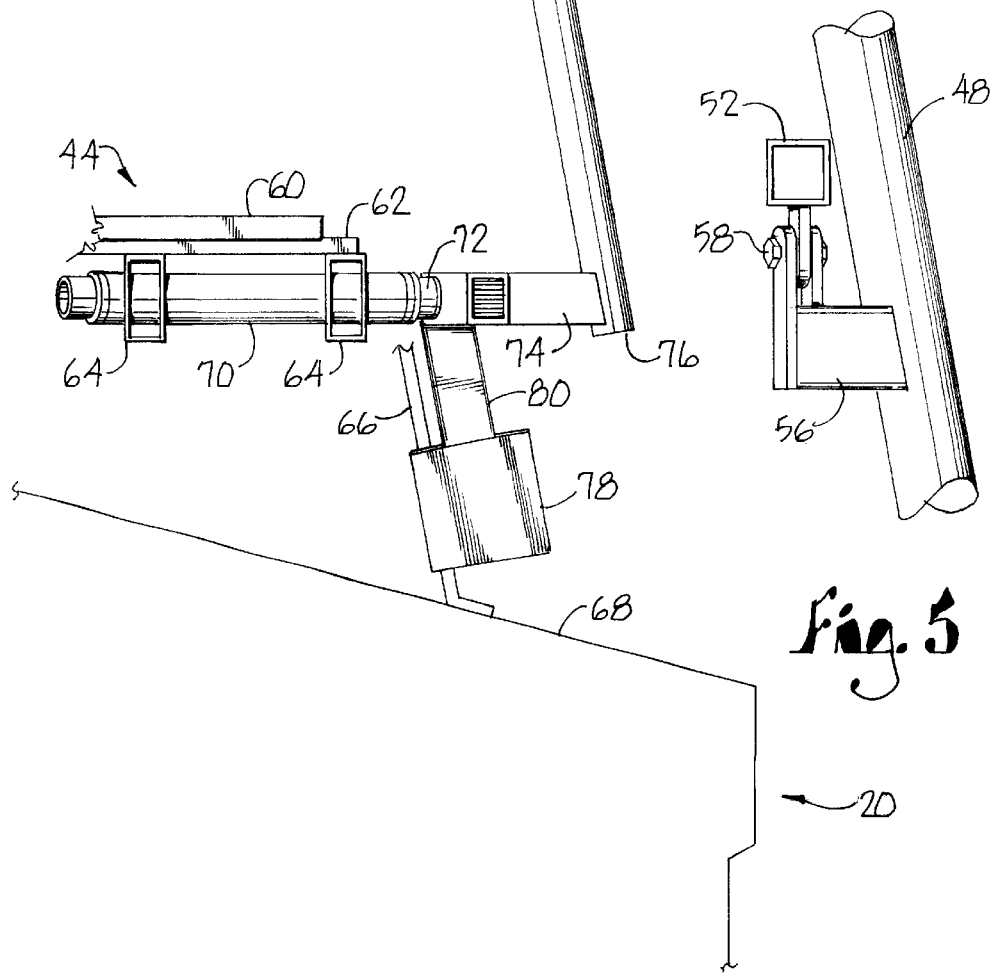

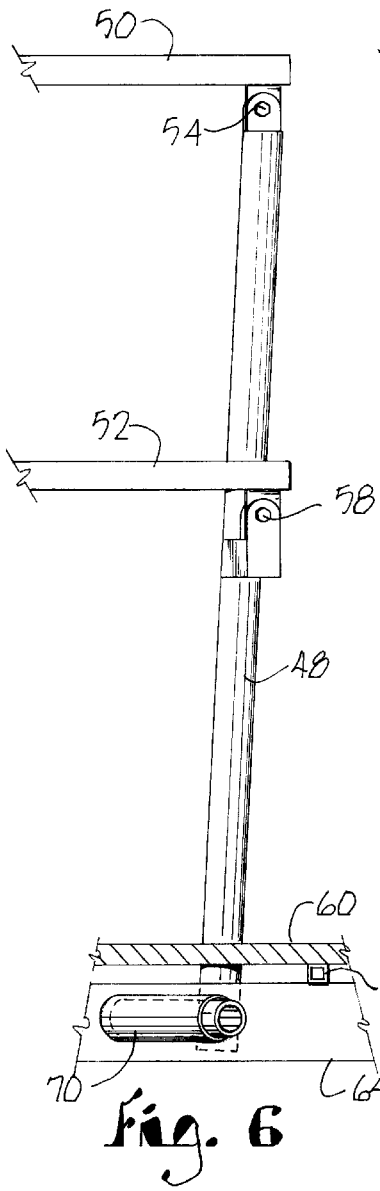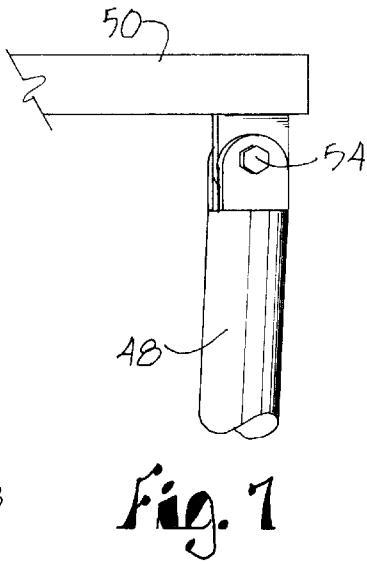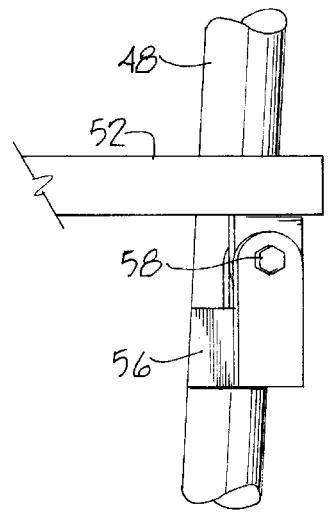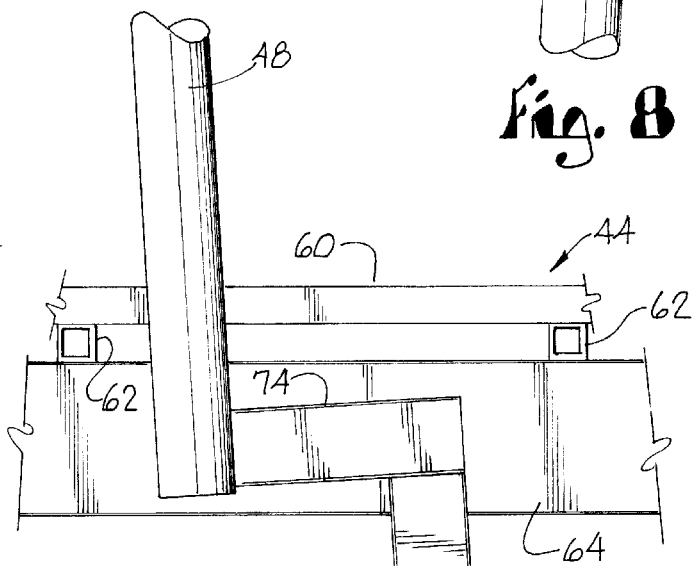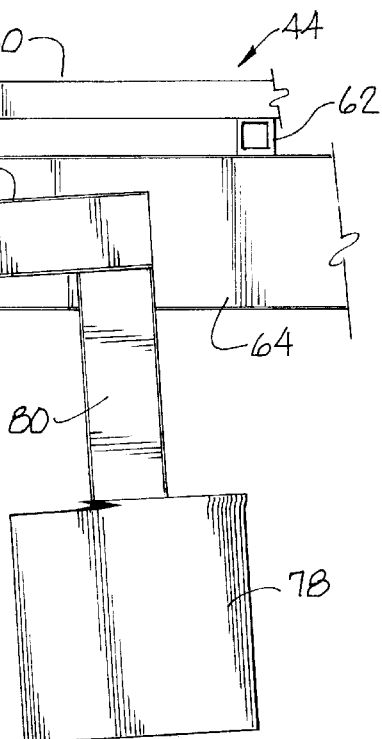

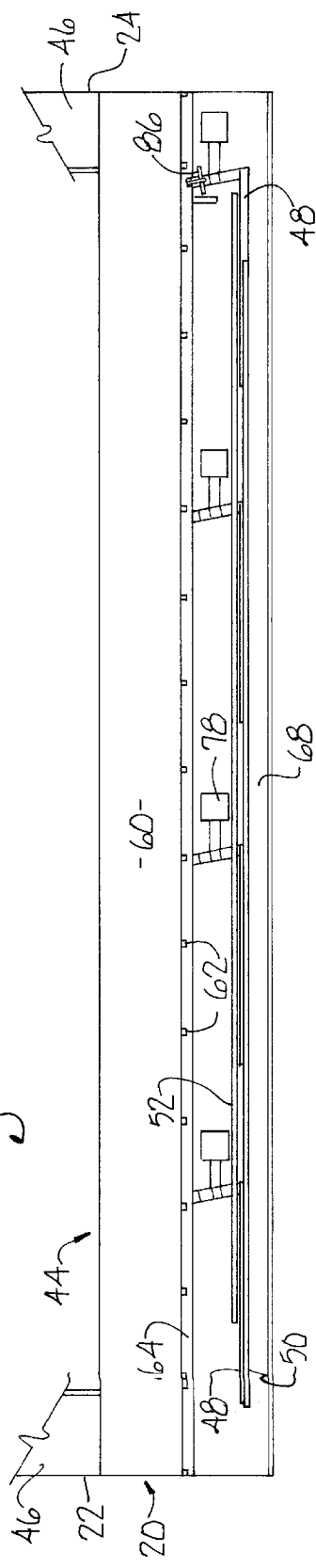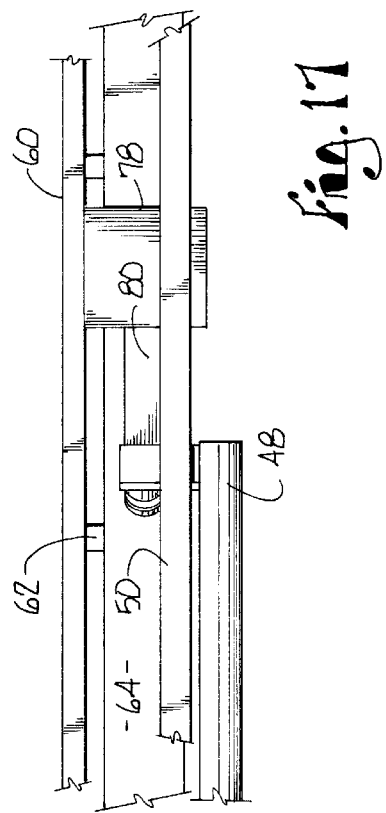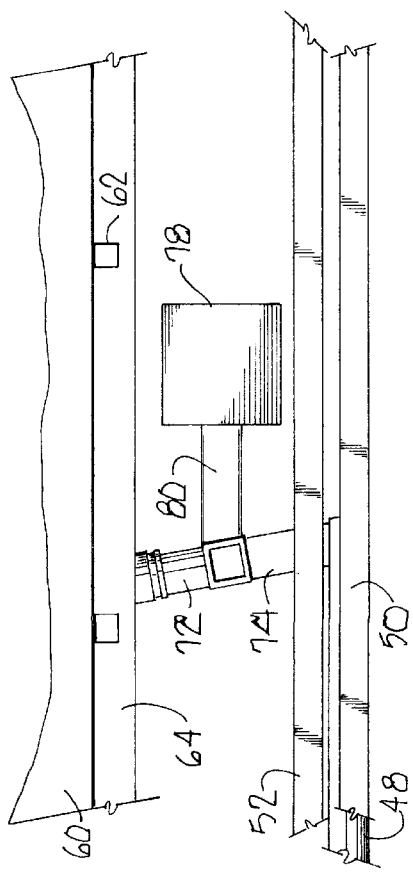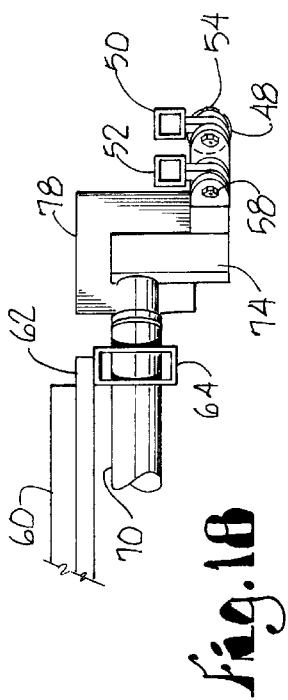

RETRACTABLE HANDRAIL FOR RAILROAD CARS

BACKGROUND OF THE INVENTION

This invention relates to improvements in railroad cars for protecting operating and service personnel from injury and, in particular, to a handrail which can be raised from a retracted position to an extended, operative position adjacent a walkway on the car used during loading and unloading operations.

Railway hopper cars have been employed for years to transport particulate and granular materials such as grain. Typically, a car is loaded or unloaded through the use of overhead chutes that extend through one or more hatches in the top of the car that have been opened for loading or unloading purposes. The covers used to close these hatches are relatively heavy, on the order of 100 pounds per cover, and thus considerable manual effort is required to open and close the hatches from the exterior walkways provided for that purpose along the top of the car. As these walkways are totally exposed and do not have guard railings, a considerable hazard is presented when handling the heavy hatch covers as slipping and falling from the walkway could result in severe injury or death.

It is believed that guard railings or other protective structures have not previously been employed on railroad cars due to the additional clearance that would have to be provided along the railroad. In the United States, railroad cars must comply with the clearance requirements of the American Association of Railroads (AAR), which makes it especially difficult to provide an effective railing that will not interfere with passage of the car through a railroad tunnel. Although a retractable railing which could be stored during transit would appear to be a solution to the problem, the space below a walkway is limited due to the configuration of the car body which compounds the problem by restricting the available space to store the railing.

SUMMARY OF THE INVENTION

It is, therefore, the primary object of the present invention to provide a retractable handrail for railroad cars which can be stored in a retracted position within the confines permitted by the car body configuration and also be within the necessary clearance for passage of the car through railroad tunnels.

In furtherance of the foregoing object, it is an important aim of this invention to provide such a handrail which extends along a car body walkway and is movable between an extended, operative position and a retracted position during transit, wherein movement of the handrail assembly is in directions downwardly and outwardly to a fully stored condition in non-interfering relationship with the car body structure.

Another important object of the present invention is to provide such a handrail assembly that includes spaced posts, each of which swing about a generally horizontal axis between the extended and retracted positions of the assembly, wherein the axis is displaced from a right angle to a longitudinal axis of the walkway and each post is also inclined from vertical at the extended position so that the assembly moves downwardly and outwardly from its extended to its retracted position.

Still another important object is to provide such a railing assembly wherein the posts and associated rails present a parallel linkage movable to a stored condition when the assembly is retracted.

Yet another important object of the invention is to provide such a handrail assembly in which the displacement of the axes of the posts and the inclination thereof when raised are approximately equal and are each no greater than about twenty-five degrees.

Other objects include the provision of an axle for each post and a member cooperating therewith to mount the post for swinging movement and cause the post to shift downwardly as the assembly moves to its retracted position; means for locking the assembly in either its extended or its retracted position until released by an operator; and counterweight means for biasing the assembly toward its extended position to assist an operator in manually raising the posts to extend the handrail assembly before entering the walkway.

Other objects will become apparent as the detailed description proceeds.

BRIEF DESCRIPTION OF THE DRAWINGS

FIG. 1 is a side elevational view showing the handrail assembly of the present invention in its extended, operative position on a railroad car, illustrated fragmentarily.

FIG. 2 is a partial plan view of the railing and car as seen in FIG. 1.

FIG. 3 is an enlarged, fragmentary, end view of the extended railing.

FIG. 4 is a detail of the top rail (end view).

FIG. 5 is a detail of the second rail (end view).

FIG. 6 is a fragmentary elevation of one of the posts as viewed from the walkway side.

FIG. 7 is a detail of the top rail (as viewed from the walkway side).

FIG. 8 is a detail of the second rail (as viewed from the walkway side).

FIG. 9 is an enlarged, fragmentary, side elevation of the base portion of one of the posts seen in FIG. 1.

FIG. 15 is a plan view of the railing in its retracted position.

FIG. 16 is an enlarged, fragmentary, plan view of one of the post supports seen in FIG. 15.

FIG. 17 is an enlarged, fragmentary, side elevational view of the railing in its retracted position.

FIG. 18 is a fragmentary, end view of the railing its retracted position, on the same scale as FIGS. 16 and 17.

DETAILED DESCRIPTION

Figure 10:
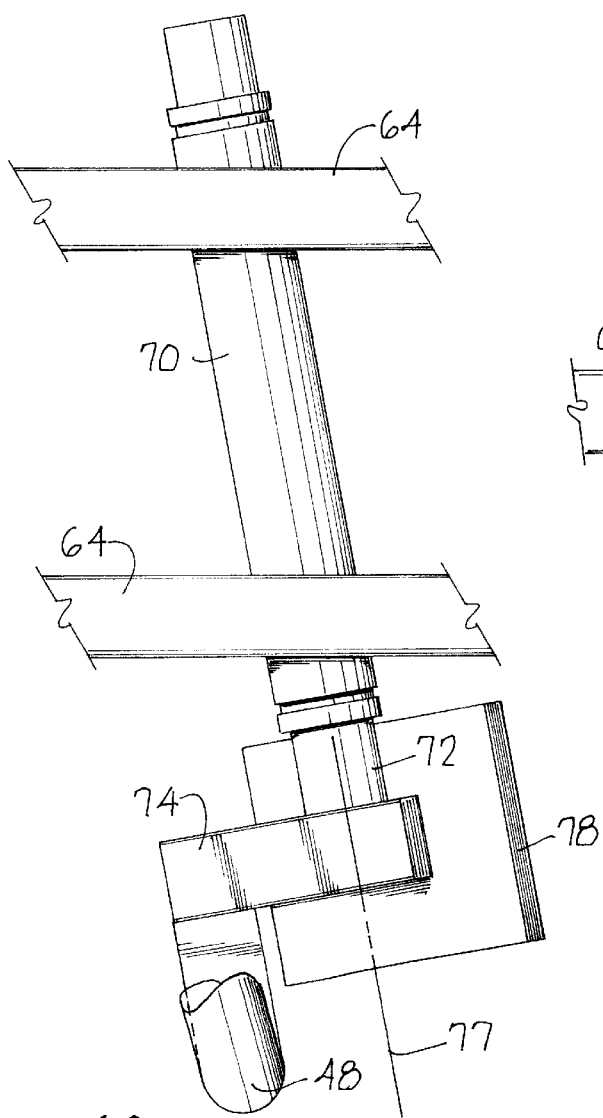
FIG. 10 is an enlarged, fragmentary, plan view showing one of the posts and its supporting axle.

FIGS. 1, 2 and 13–15 show the handrail assembly of the present invention mounted on a railroad car 20 having a left end 22 and a right end 24 as viewed in the drawings. The car body is longitudinally foreshortened for ease in illustration and is shown fragmentarily. The car 20 is provided with a hatch cover system 26 which extends longitudinally along the top of the car 20 essentially from the left end 22 to the right end 24. The cover system 26 is not shown in the side elevational views of FIGS. 1, 13 and 14 and thus the top edge of a coaming 28 is revealed which presents a hatch that defines a longitudinal opening along the top of the car 20 communicating with the internal storage compartment of the car therebelow.

The particular hatch cover system 26 illustrated has a series of end-to-end, main hatch covers 30, 32 and 34 extending longitudinally along the top of the car atop the coaming 28, and four longitudinally spaced, secondary circular access port covers 36, 38, 40 and 42 located at the left and right ends thereof and at immediate positions between main covers 30 and 32, and 32 and 34. The hatch cover system 26 illustrated is of the type shown and described in U. S. Pat. No. 5,517,925 to Stephen R. Early, owned by the assignee herein, wherein the secondary covers 36–42 are individually openable and also serve as battens to release the main covers 30, 32 and 34 so that they may be swung to open positions.

As is typical in railway hopper cars, access to the hatch cover system 26 is provided by an exterior walkway 44 extending longitudinally of the car 20 along the top thereof adjacent and generally parallel to the end-to-end, main hatch covers 30, 32 and 34. In FIGS. 1, 2 and 13–15, the walkway 44 is shown extending along one side of the car 20, it being understood that an identical walkway (not shown) is provided along the opposite side of the hatch cover system 26. Short walkways 46 at the ends 22 and 24 of the car 20 are partially shown in FIGS. 2 and 15 and interconnect the two side walkways to thereby provide complete access to the hatch cover system 26 from either the sides or the ends of the car 20. As each of the hatch covers 30–42 is swung between open and closed positions about a horizontal axis parallel to the longitudinal center line of the car 20, the side walkways as illustrated by walkway 44 are occupied by operating personnel standing thereon during manual raising and lowering of the covers. It is the hazard thus presented to which the present invention is directed, as the handrail assembly to be described greatly minimizes the possibility that a workman could slip and fall from the walkway 44 while manipulating the heavy main hatch covers 30, 32 and 34.

Figure 13:
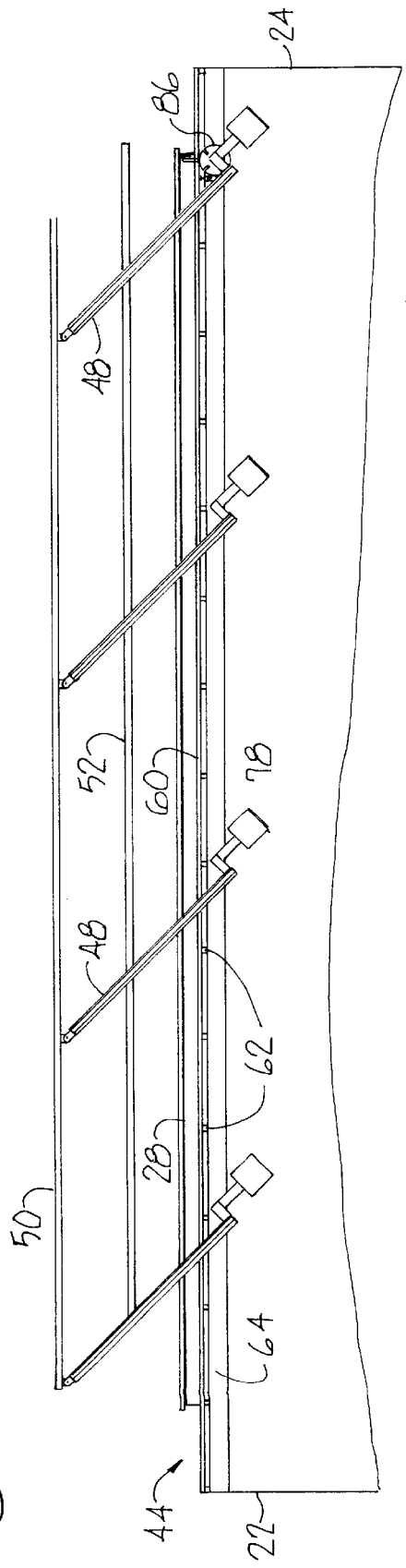
FIG. 13 is a side elevational view similar to FIG. 1 but showing the railing partially lowered.
Figure 14:
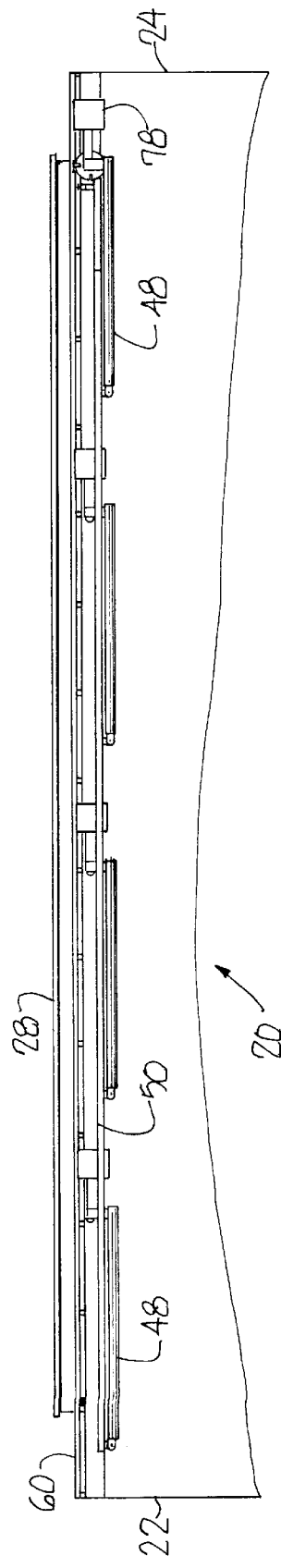
FIG. 14 is a side elevational view similar to FIG. 1 but he railing completely lowered to its retracted position.

The handrail assembly comprises a plurality of longitudinally spaced posts 48 and upper and lower rails 50 and 52, respectively, pivotally connected to the posts 48 to present a parallel linkage. In FIGS. 1–3 the handrail assembly is shown in its extended position in which the posts 48 are raised and are essentially vertical as viewed in side elevation (FIG. 1). Although four posts 48 and a pair of rails 50, 52 are illustrated, it may be appreciated that additional posts and, if desired, additional rails may be employed depending upon the length of the car 20 and the vertical spacing desired between adjacent rails when the assembly is extended to its operative position. As will be discussed, the handrail assembly is movable to a retracted position shown in FIG. 14 where the posts 48 are lowered to essentially horizontal dispositions and the entire assembly is in a compact, stored condition for transit as may be particularly appreciated by comparing FIG. 14 and the end view of FIG. 18. FIG. 13 shows the assembly partially retracted.

In FIGS. 3–8, the interconnection of the posts 48 with the rails 50 and 52 is shown in detail. A clevis and pin connection 54 at the outer end of each post 48 pivotally attaches upper rail 50 to the post 48, it being appreciated that the posts and the rails may be cut to length from tubular steel stock and the clevis parts welded thereto to form the connections 54. Similarly, a short, horizontal bar 56 projects inwardly from each post 48 at about midway along its length and serves as a mount for a clevis and pin connection 58 to the lower rail 52. A comparison of FIGS. 3 and 18 reveals the change in the relative positions of the two rails 50 and 52 as the posts 48 are lowered to the retracted position of FIG. 18 where rail 50 is outboard and alongside rail 52.

The manner in which the handrail assembly is supported on the walkway 44 is shown in detail in FIGS. 3, 6, 9 and 10. The walkway 44 presents a running board 60 that may be constructed from foraminous metal floor panels secured to transverse joists 62 that overlie two or more horizontally spaced, longitudinally extending beams 64 as required to support the walkway structure. A supporting strut 66 is shown fragmentarily in FIG. 3 and extends from the outboard beam 64 to the top surface 68 of the car 20 to further stabilize the walkway structure, it being appreciated that a number of struts 66 would in practice be spaced along the walkway 44 as is conventional in walkways of the type illustrated.

An axle assembly for each post 48 is shown in detail in FIGS. 3 and 10 and includes a support sleeve 70 carried by the outboard beam 64 and adjacent beam 64, and within which a coaxial, tubular shaft rotates to present an axle 72 extending horizontally outwardly from beneath running board 60. An angle member 74 is secured (as by welding) to the outer end of axle 72. The member 74 is rigidly connected to the base of post 48 by a welded joint that unites the outer end of member 74 with the lower end 76 of post 48. Accordingly, the post 48 swings about an axis 77 defined by axle 72 which is offset from the base of the post as may be appreciated from viewing FIGS. 6, 9 and 10. It should also be noted that the axis 77 is displaced about ten to fifteen degrees from a right angle to a longitudinal axis of the walkway 44 defined, for example, by the inboard longitudinal beam 64 (shown in FIG. 10 and in broken lines in FIG. 2).

Furthermore, it is important to note that the connection between the outer end of each angle member 74 and the associated post 48 does not present a right angle between these two components. As is particularly evident in FIG. 3, post 48 when raised and fully erect is inclined from the vertical at an angle of about ten to fifteen degrees. Accordingly, the displacement of the rotational axis 77 of each post 48 and the inclination of each post from vertical when fully raised are approximately equal and result in movement of the post 48 and rails 50 and 52 downwardly and outwardly as the handrail assembly is moved from its extended to its retracted position. Therefore, when stored for transit as shown in FIG. 18, all components of the handrail assembly are clear of the top surface 68 of car 20 (compare with FIG. 3). In this manner movement of the handrail assembly to its retracted position accommodates the gradually sloping top surface 68 to preclude interference of any of the components of the assembly with the car structure. If required, the a displacement of the post axes 77 and the inclination of the posts 48 may be increased to about twenty-five degrees to accommodate the car configuration.

Figure 11:
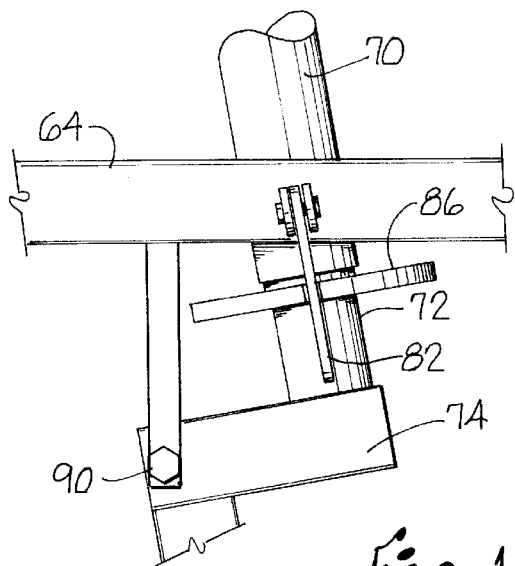
FIG. 11 is a detail view showing the lock in plan.
Figure 12:
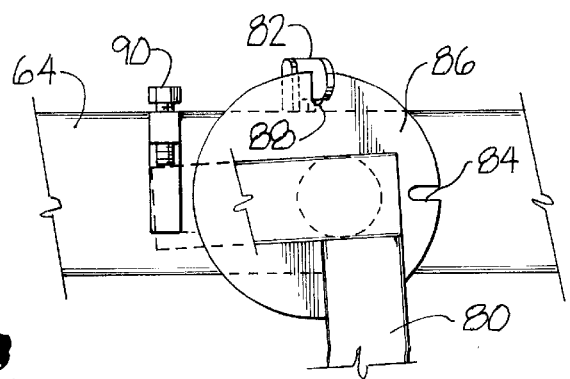
FIG. 12 is a detail view showing the lock in side elevation.

To assist in raising the assembly to its extended position, a counterweight 78 for each post 48 is mounted on the end of a lever arm 80 which is joined to and extends from the outer end of the corresponding axle 72. The counterweights 78 thus bias the handrail assembly toward its extended position so that a workman, upon entering walkway 44 at end 24 of the car 20, can easily raise the railing to its operative position by releasing a pivotal locking arm 82 (FIGS. 11 and 12). This is accomplished by withdrawing the arm 82 from a notch 84 in the periphery of a disk 86 coaxially mounted on and rotatable with the axle 72 of the right end post 48. To retain the railing in its extended position, the locking arm 82 is inserted into a second notch 88 in disk 86 spaced ninety degrees from notch 84 as shown in FIG. 12. An adjustable stop 90 is engaged by member 74 when the assembly reaches its extended position.

From the foregoing and a comparison of FIGS. 3 and 18, it may be appreciated that when the railing is raised to its operative position, the horizontal rails 50 and 52 shift inwardly from their stored condition to an uppermost, raised position (FIG. 3) where they are essentially in a vertical plane at or near the longitudinal edge of the walkway in order to support any workmen standing thereon. However, when returned to the stored condition (handrail assembly retracted) shown in FIG. 18, the rails 50 and 52 move outwardly as well as downwardly to avoid any contact with the top surface 68 of the car body 20 therebeneath. The outward movement of the rails 50 and 52 is also apparent from a comparison of FIGS. 2 and 15. Any problem with clearance during transit is also not presented because the parallel linkage formed by the posts and rails collapses to a compact configuration as viewed in transverse cross-section or in end elevation as seen in FIG. 18.

As it is necessary to handle the hatch covers from both sides of the car 20, a handrail assembly identical to that shown and described for walkway 44 would be provided for the walkway (not shown) on the opposite side of the hatch cover system 26. The arrangement would preferably be a mirror image of the assembly illustrated so that common access to the walkways, and the raising of the railing assemblies to their operative positions, is at the right end 24 of the car 20.

Having thus described the invention, what is claimed as new and desired to be secured by Letters Patent is as follows:

1. In a railroad car having a load-receiving body provided with a walkway having a longitudinal axis and extending along the body to permit access thereto, the improvement comprising:

a handrail assembly extending along said walkway and having longitudinally spaced posts, a longitudinally extending rail structure and means pivotally interconnecting said posts and said rail structure, each of said posts having a base, support means connected with the base of each of said posts and including an axle for each of said posts defining a generally horizontal axis therefor position at a non-orthogonal angle from said longitudinal axis of the walkway for movement of said assembly between an extended position, where the posts are raised, and a retracted position where the posts are lowered, said assembly including means mounting each of said posts at an angle inclined from vertical at said extended position for swinging movement of the posts and movement of the rail structure downwardly and outwardly as the posts and rail structure move with the assembly from said extended to said retracted position thereof, and said mounting means including a member on each of said axles rigid with the base of a corresponding said post.

2. The improvement as claimed in claim 1, wherein said rail structure includes a plurality of longitudinally extending rails which are vertically spaced when said assembly is in said extended position.

3. The improvement as claimed in claim 2, wherein said posts and said rails present a parallel linkage movable to a stored condition when said assembly is retracted.

4. The improvement as claimed in claim 1, wherein said support means provides the axis for each of said posts beneath the walkway.

5. The improvement as claimed in claim 1, wherein displacement of the axis of each of said posts to the non-orthogonal angle and the inclination of the posts from the vertical are approximately equal.

6. The improvement as claimed in claim 5, wherein said displacement and said inclination are each no greater than about twenty-five degrees.

7. The improvement as claimed in claim 5, wherein said displacement and said inclination are each about ten to fifteen degrees.

8. The improvement as claimed in claim 1, wherein each of said members is configured to displace an associated said post from the axis thereof to cause the post to shift downwardly as the assembly moves to said retracted position.

9. The improvement as claimed in claim 1, wherein said axle is rotatable, and further comprising a locking component on said axle rotatable therewith, and selectively operable means engageable with said component for locking the axle against rotation when the assembly is in either said extended or said retracted position.

10. The improvement as claimed in claim 1, further comprising counterweight means associated with at least one of said posts for biasing movement of the assembly toward said extended position.

11. In a railroad car having a load-receiving body provided with a series of hatch covers along the top of the body and a longitudinally extending walkway adjacent the covers to permit operator access thereto, the improvement comprising:

a handrail assembly adjacent an outer longitudinal edge of said walkway and having longitudinally spaced posts, a longitudinally extending rail structure and means pivotally interconnecting said posts and said rail structure, each of said posts having a base, support means connected with the base of each of said posts and including an axle for each of said posts defining a generally horizontal axis therefor positioned at a non-orthogonal angle from a longitudinal axis of the walkway for movement of said assembly between an extended position, where the posts are raised, and a retracted position where the posts are lowered, said assembly including means mounting each of said posts at an angle inclined from vertical at said extended position for swinging movement of the posts and lateral movement of the rail structure downwardly and outwardly as the posts and rail structure move with the assembly from said extended to said retracted position thereof, and said mounting means including a member on each of said axles rigid with the base of a corresponding said post.

12. The improvement as claimed in claim 11, wherein said rail structure includes a plurality of longitudinally extending rails which are vertically spaced when said assembly is in said extended position.

13. The improvement as claimed in claim 12, wherein said posts and said rails present a parallel linkage movable to a stored condition when said assembly is retracted.

14. The improvement as claimed in claim 11, wherein displacement of the axis of each of said posts to the non-orthogonal angle and the inclination of the posts from the vertical are approximately equal.

15. The improvement as claimed in claim 14, wherein said displacement and said inclination are each no greater than about twenty-five degrees.

16. The improvement as claimed in claim 2, wherein each of said members is configured to displace an associated said post from the axis thereof to cause the post to shift downwardly as the assembly moves to said retracted position.

* * * * *